(12) United States Patent
Lee et al.

(10) Patent No.: US 7,949,576 B2
(45) Date of Patent: May 24, 2011

(54) METHOD OF PROVIDING PRODUCT DATABASE

(75) Inventors: Hyang Cheol Lee, Seoul (KR); Joon Hyock Moon, Seoul (KR); Bum Joo Park, Seoul (KR)

(73) Assignee: NHN Business Platform Corporation, Seongnam-si (KR)

( * ) Notice: Subject to any disclaimer, the term of this patent is extended or adjusted under 35 U.S.C. 154(b) by 551 days.

(21) Appl. No.: 11/945,138

(22) Filed: Nov. 26, 2007

(65) Prior Publication Data

US 2008/0097976 A1 Apr. 24, 2008

Related U.S. Application Data

(63) Continuation of application No. PCT/KR2006/001858, filed on May 18, 2006.

(30) Foreign Application Priority Data

May 26, 2005 (KR) .................. 10-2005-0044404

(51) Int. Cl.
*G06Q 30/00* (2006.01)

(52) U.S. Cl. ....................................................... 705/27

(58) Field of Classification Search .................. 705/26, 705/27, 2
See application file for complete search history.

(56) References Cited

U.S. PATENT DOCUMENTS

| 5,943,670 A | 8/1999 | Prager |
| 6,571,240 B1 | 5/2003 | Ho et al. |
| 7,047,211 B1 * | 5/2006 | Van Etten et al. ............... 705/26 |
| 7,290,012 B2 * | 10/2007 | Charlet et al. ......................... 1/1 |

FOREIGN PATENT DOCUMENTS

| JP | 2004-078689 A | 3/2004 |
| KR | 10-1999-0031784 A | 5/1999 |
| KR | 10-2002-0003915 A | 1/2002 |

OTHER PUBLICATIONS

Norbert Fuhr, et al. "XIRQL: A Query Language for Information Retrieval in XML Documents", 2001, ACM 1-58113-331-6/01/0009.*

Ivo Vollrath, et al. "Case-Based Reasoning Support for Online Catalog Sales", IEEE Internet Computing, Jul.-Aug. 1998, 1089-7801/98.*

International Search Report dated Aug. 28, 2006 in PCT Application PCT/KR2006/001858, which is the parent application of this application.

* cited by examiner

*Primary Examiner* — Naeem Haq
(74) *Attorney, Agent, or Firm* — H.C. Park & Associates, PLC

(57) ABSTRACT

A category recommendation method includes maintaining a category database including an internal identifier and an internal category to which the internal identifier belongs; externally receiving a foreign identifier and a foreign category where the foreign identifier belongs to from an outside; extracting a query associated with the foreign identifier; and recommending at least one of the internal categories stored in the category database by using the query as a category corresponding to the foreign identifier.

16 Claims, 7 Drawing Sheets

FIG.3

| INTERNAL IDENTIFIER (301) | INTERNAL CATEGORY (302) | SEARCH FIELD (303) |
|---|---|---|
| KTF-X5500 | APPLIANCE, CELLULAR PHONE > CELLULAR PHONE/ PDA/NAVIGATION > CELLULAR PHONE | ...<br><brand>KTF EVER</brand><br><model>KTF-X5500</model><br><item>CELLULAR PHONE</item><br>...<br><keyword>KTF</keyword><br><keyword>SONGHYEGYO PHONE</keyword><br><keyword>DJ PHONE</keyword><br>... |
| ... | ... | ... |

FIG.6 http://shoppingadmin.naver.com/shopping/search/category_index_new_sim_0.5.php-Microsoft Internet Explorer

FILE  EDIT  VIEW  ADD  TOOL  HELP http://shoppingadmin.naver.com/shopping/search/category_index_new_sim_0.5.php mall_id = dnshop
cat_name = FOOD/MART@IMPORTEDFOOD@SNACK(EFOODMART)@
pname = LOVELETTER COCONUT query = SNACK EFOODMART LOVELETTER COCONUT

| cat_id | cat_name1 | cat_name2 | cat_name3 | cat_name4 | count |
|---|---|---|---|---|---|
| 08040103 | FOOD/SUPERMARKET | PROCESSEDFOOD | CONFECTIONARIES | COOKIE/BISCUIT/PIE | 1 | query = FOODMART IMPORTEDFOOD SNACK EFOODMART LOVELETTER COCONUT

| cat_id | cat_name1 | cat_name2 | cat_name3 | cat_name4 | count |
|---|---|---|---|---|---|
| 08040103 | FOOD/SUPERMARKET | PROCESSEDFOOD | CONFECTIONARIES | COOKIE/BISCUIT/PIE | 1 | query = LOVELETTER COCONUT

| cat_id | cat_name1 | cat_name2 | cat_name3 | cat_name4 | count |
|---|---|---|---|---|---|
| 08040103 | FOOD/SUPERMARKET | PROCESSEDFOOD | CONFECTIONARIES | COOKIE/BISCUIT/PIE | 1 |

METHOD OF PROVIDING PRODUCT DATABASE

CROSS-REFERENCE TO RELATED PATENT APPLICATIONS

This application is a continuation application under 35 U.S.C. §365(c) of International Application No. PCT/KR2006/001858, filed May 18, 2006 designating the United States. International Application No. PCT/KR2006/001858 was published in English as WO2006/0126800 A1 on Nov. 30, 2006. This application further claims the benefit of the earlier filing date under 35 U.S.C. §365(b) of Korean Patent Application No. 10-2005-0044404 filed May 26, 2005. This application incorporates herein by reference the International Application No. PCT/KR2006/001858 including the International Publication No. WO2006/0126800 A1 and the Korean Patent Application No. 10-2005-0044404 in their entirety.

BACKGROUND

1. Field

The present disclosure relates to a price comparison engine and more particularly to building and updating product databases for a price comparison engine.

2. Background

Generally, a price comparison engine maintains a product database, which contains information of products offered by various on-line stores. The information includes product names, identification codes for products, product prices, product descriptions, on-line stores offering products, and classifications of products. Typically price comparison engines maintain their own product classification system or adopt a publicly available product classification system for facilitating product searches and database management. For example, a cellular phone, a computer, and an MP3 player are respectively classified like appliance/cellular phone, computer/peripheral device, and appliance/audio/MP3. Also, multimedia files, news, and other information may be classified and stored along with their classification or category information. Generally, the product category and classification system has a hierarchical structure.

A shopping mall relay service or price comparison service provides its users with price information for products and on-line store information selling the products. When displaying the price information, the service provides its users with a link of the on-line stores. For providing the goods relay service, information received from on-line stores is stored in a database in a goods relay server.

The foregoing discussion in this section is to provide general background information and does not constitute an admission of prior art.

SUMMARY

One aspect of the invention provides a method of updating a product database. The method comprises: providing a database comprising a plurality of database entries, wherein each database entry comprises a classification field and a plurality of additional fields, wherein the classification field comprises a classification of an item of the database entry; providing data associated with a product item for adding to the database as a new entry; generating a query from the data associated with the product; computing a correlation value of the query with information saved in at least one selected field of a database entry, wherein computing is repeated for at least part of the plurality of database entries; identifying database entries including information in the at least one selected field, which has a correlation value greater than a predetermined value; determining the most popular classification among classifications saved in the classification fields of the identified database entries; and assigning the most popular classification to the classification field of the new entry.

In the foregoing method, the data may be retrieved from an on-line store for selling the product. The query may comprise a word or phrase that the on-line store uses to identify, describe or classify the product. The plurality of fields may further comprise a product source field, wherein the method may further comprise adding to the product source field a name of the on-line store. The plurality of fields may further comprise a price field, wherein the method may further comprise adding to the price field a price of the product available at the on-line store. The method may further comprise filtering the price field of a group of database entries using a price range so as to select a smaller group of entries with a price falling in the price range.

Still in the foregoing method, providing data may comprise receiving the data from an on-line store, wherein the data may comprise at least one selected from the group consisting of a name of the product, a classification of the product, an identification code of the product, and a description of the product that are used in the on-line store. The query may be created using terms in the name of the product, the classification of the product, the identification code of the product, and the description of the product. The plurality of fields may comprise a product identification code field, wherein the method may further comprise determining whether the database comprises a database entry having an internal identifier in the product identification code field that is identical to the identification code of the product that is used in the on-line store. Generating, computing, identifying and determining may be conducted only when it is determined that there is no database entry that includes the identical identification code in the product identification code field. The at least one selected field may comprise the product identification code field. The at least one selected field may comprise a field other than the product identification code field. The internal identifier may be a model number of the product.

Yet in the foregoing method, the query may comprise a string of plurality of words associated with the product. Determining may comprise: identifying different classifications used in the identified database entries; counting the number of database entries for each different classification; and comparing the counted numbers to determine the most popular classification.

Another aspect of the invention provides a method of running a price comparison engine, the method comprising: maintaining a product database comprising the foregoing method; receiving, from a remote computer, a search request for a type of products; conducting a search in the database using information included in the search request; and sending a search result to the remote computer.

A further aspect of the invention provides a method of a product database, which comprise: providing a product database comprising a plurality of fields for each database entry, the plurality of fields comprising a classification field; providing data associated with a product for adding to the database as a new entry; extracting at least one term from the data associated with the product; conducting at least one search using the at least one term in the database so as to locate a plurality of entries including the at least one term in at least one field thereof; and assigning, to the classification field of the new entry, information or a value that is the most popular in the classification fields of the plurality of entries located in the at least one search.

In the foregoing method, the data may be retrieved from an on-line store for selling the product. The data may comprise at least one selected from the group consisting of a name of the product, a classification of the product, an identification code of the product, and a description of the product that are used in the on-line store. The query may be created using terms in the name of the product, the classification of the product, the identification code of the product, and the description of the product.

An aspect of the present invention provides a category recommendation method and a system which can extract a query associated with a foreign identifier and recommend an internal category having a high similarity with the query as a category corresponding to the foreign category, so that a proper category for the foreign category is effectively recommended.

An aspect of the present invention also provides a category recommendation method and a system which can immediately and accurately recommend a proper category for a foreign category from internal categories stored in a database, so that information on Internet websites is systemically collected.

An aspect of the present invention also provides a category recommendation method and a system which can recommend a proper category for a foreign identifier from an internal category stored in a database, so that category matching is automated by increasing a recommendation matching rate.

An aspect of the present invention also provides a category recommendation method including: maintaining a category database including an internal identifier and an internal category to which the internal identifier belongs; externally receiving a foreign identifier and a foreign category where the foreign identifier belongs to from an outside; extracting a query associated with the foreign identifier; and recommending at least one of the internal categories stored in the category database by using the query as a category corresponding to the foreign identifier.

In this case, the internal identifier and internal category indicate an identifier and a category used in a predetermined goods relay server, and the foreign identifier and foreign category indicate an identifier and a category used in other goods relay servers, excluding the predetermined goods relay server. In this case, the identifier is for identifying goods, a multimedia file, knowledge, news and the like, i.e. a goods name, a file name, a keyword of the knowledge and a title of the news.

As an example, the internal identifier and the internal category are an identifier and a category used in the predetermined goods relay server, the foreign identifier and foreign category are an identifier and a category used in a shopping mall server associated with the goods relay server.

The extracted query may be used as a query for searching a category database. In this case, both the foreign identifier and the internal identifier may be goods identifiers, the recommending at least one of the internal categories stored in the category database by using the query as a category corresponding to the foreign identifier may search the category database using the extracted query and recommend internal identifiers whose similarity to the query is greater than a predetermined level.

An aspect of the present invention provides a category recommendation system including: a category database including an internal identifier and an internal category to which the internal identifier belongs; a receiving unit receiving a foreign identifier and a foreign category to which the foreign identifier belongs; a query extraction unit extracting a query associated with the foreign identifier; and a category recommendation unit recommending at least one of the internal category stored in the category database by using the query as a category corresponding to the foreign identifier.

BRIEF DESCRIPTION OF THE DRAWINGS

FIG. 3 is diagram illustrating an embodiment of the category database;

FIG. 6 is a diagram illustrating a display of counting a number of internal identifiers for each internal category according to a query, according to an embodiment of the present invention;

DETAILED DESCRIPTION OF EMBODIMENTS

Embodiments of the invention will be described in detail with reference to the accompanying drawings.

In order to sell products, on-line store services provide product information. Each on-line store classifies product information into a category according to its own classification system. For example, on-line store 'A' classifies an accessory product into the category of 'fashion/jewelry/18K', while on-line store 'B' classifies the same product into a category of 'accessory/gold/18K'.

Because these on-line stores' classifications can be different from another, it would be difficult that a price comparison engine's own product database adopts one of the various classifications from the on-line stores. Thus, a price comparison engine typically has its own classification system for use in its product database. Various aspects of the invention involve building and updating a product database for a price comparison engine. More particularly, various features of the invention involve creating, suggesting or proposing a classification of a product under the classification system of the price comparison engine. Creating, suggesting or proposing a classification utilizes the existing data of the product database of the price comparison engine.

Figure 1:
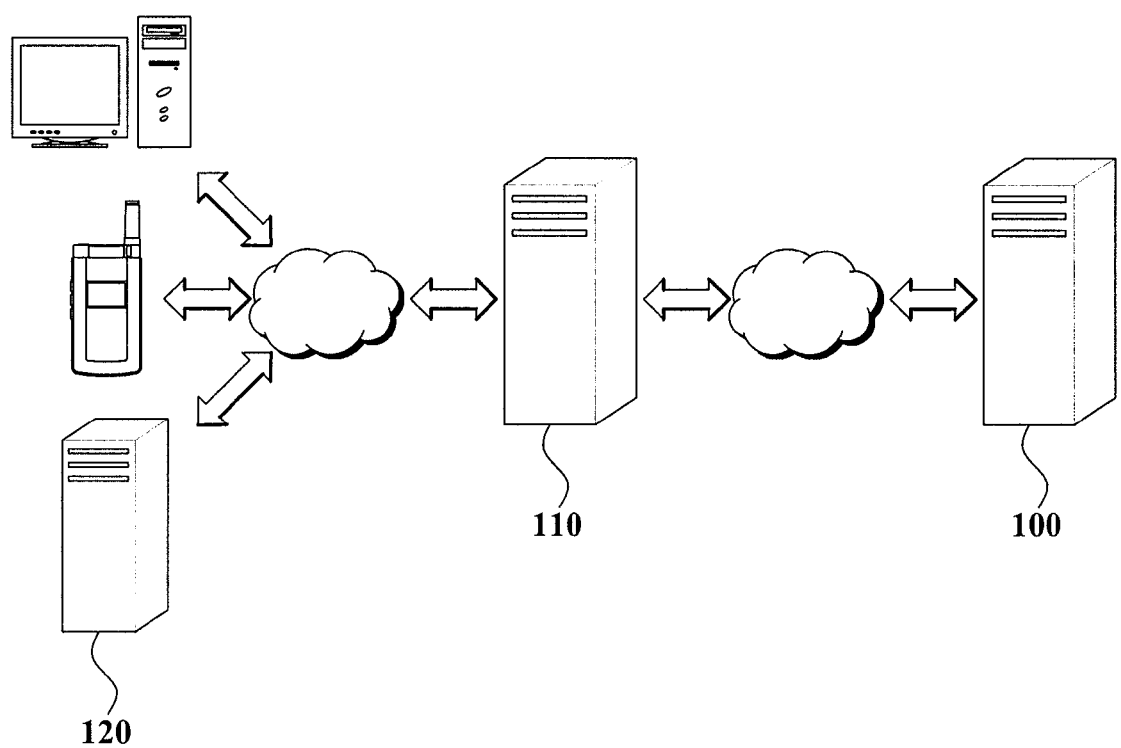
FIG. 1 is a diagram briefly illustrating a network connection association of a goods relay server, a shopping mall server, and goods register, according to an embodiment of the present invention.

FIG. 1 is a diagram briefly illustrating a network connection association of a goods relay server 100, a shopping mall server 110, and goods register 120, according to an embodiment of the present invention. For convenience of description, only the shopping mall server 110 corresponding to the goods relay server 100 is illustrated in FIG. 1, however the goods relay server 100 may operate in interoperation with a plurality of the shopping mall server 110.

A category recommendation method according to one embodiment of the present invention may be performed by a predetermined category system, and the category recommendation method may be performed in the goods relay server 100 and the shopping mall server 110, or in interoperation with the goods relay server 100 and the shopping mall server 110.

The category recommendation system maintains a category database including an internal identifier, i.e. a goods identifier, used in a predetermined goods relay server 100 and an internal category, i.e. a goods category, in which the internal identifier belongs, and receives a foreign identifier, i.e. a goods identifier, and a foreign category, i.e. a goods category, of goods information registered in the shopping mall server 110.

Also, the category recommendation system extracts a query associated with the foreign identifier. In this case, the category recommendation system may extract the query by exclusively using the foreign identifier, i.e. a goods identifier, and may extract the query by using both the foreign identifier and the foreign category in which the foreign identifier belongs. The above described extracting of the query may be performed by various methods, and as long as the query associated with the foreign identifier is extracted, any method is used for the extracting of the query, is included in one embodiment of the present invention. As an example, the query may be extracted by eliminating a space of the foreign identifier, or may be extracted by using spacings of the foreign identifier. Also, the query may be extracted by eliminating the space of the foreign identifier and the foreign category, by using the spacings of the foreign identifier and the foreign category, or by analyzing a morpheme of the foreign identifier and the foreign category. In this case, when the foreign category has a hierarchical structure, the extracting of the query extracts the query by using a partial field of the hierarchical structure of the foreign category, i.e. a lowest hierarchical category, where, for example, '18K' within 'fashion/jewelry/18K' may be used for the extracted query.

Next, the category recommendation system recommends at least one of the internal categories stored in the category database by using the query as a category corresponding to the foreign identifier. In this case, the category recommendation system automatically matches a most appropriate internal category to a category corresponding to the foreign identifier.

Usually, when identifiers, i.e. a goods identifier, are similar, categories in which the identifiers belong are accordingly similar, so that a category for a foreign identifier, e.g. a new goods identifier, may be immediately and accurately established by searching the category database using the query, extracting internal identifiers whose similarity to the query is greater than a predetermined level, and recommending at least one of the internal category as a category corresponding to the foreign identifier, in an order of the internal category having a greater number of extracted internal identifiers.

Figure 2:
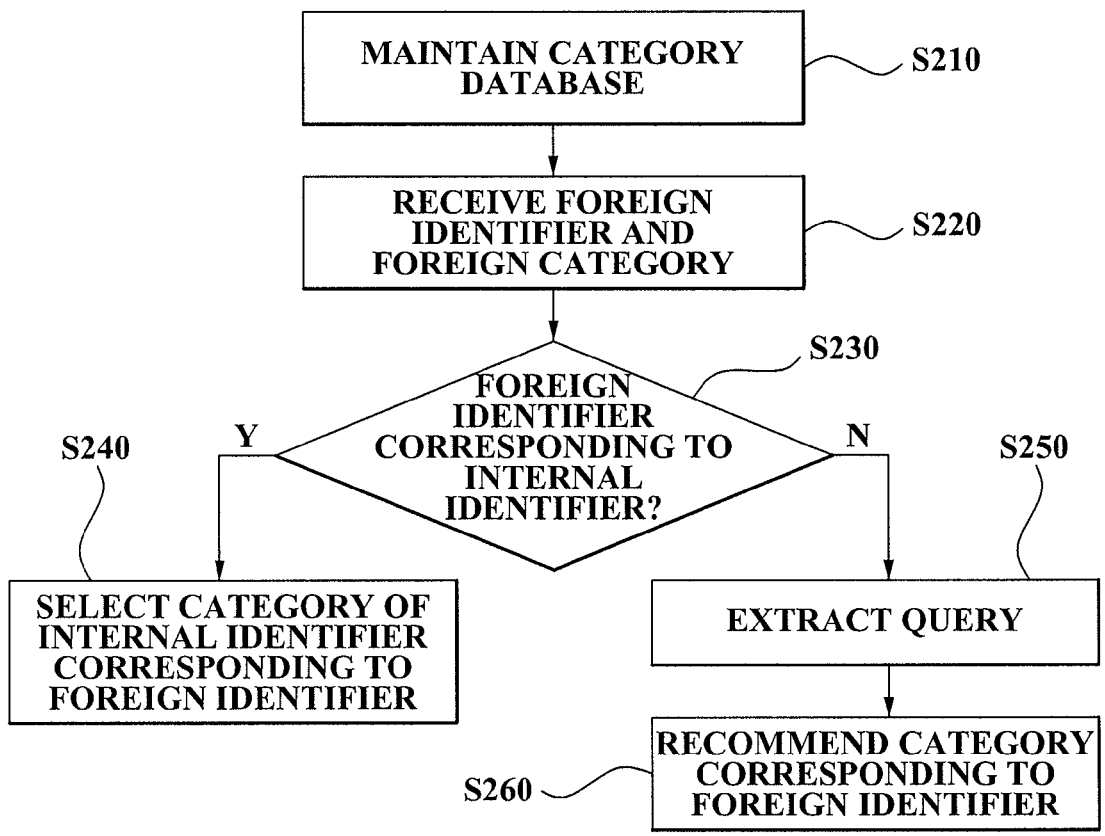
FIG. 2 is a flowchart illustrating operations of a category recommendation method according to an embodiment of the present invention.

FIG. 2 is a flowchart illustrating operations of a category recommendation method according to an embodiment of the present invention.

The category recommendation method according to one embodiment of the present invention may be performed by a predetermined category recommendation system, and the category recommendation system may be performed in a goods relay server and a shopping mall server, or in interoperation with a goods relay server and a shopping mall server.

Referring to FIG. 2, the category recommendation method according to one embodiment of the present invention maintains a category database in operation S210.

FIG. 3 is diagram illustrating an embodiment of the category database.

As illustrated in FIG. 3, the category database may include internal identifiers 301 used in a goods relay server and the like, an internal category 302 in which each of the internal identifiers 301 belong, and a search field 303.

As an example, the internal identifier 301 may be a goods identifier and an identifier (ID) used for identifying each goods model in the goods relay server. The internal category 302 may be an internal category used in the goods relay server. The internal category 302 may be stored in a type of an ID indicating a category. The search field 303 may be a field of a search object when searching a recommendation category using a query. The search field 303 may include information associated with each goods model, e.g. a brand name, a model name, an item name, a keyword, and the like, or information regarding a category. As an example, the search field 303 may exclusively include information regarding the internal identifier 301, and may include information regarding both the internal identifier 301 and information regarding the internal category 302.

In FIG. 3, the internal category is recorded in the category database as a separate data field from the search field 303, and which falls within the scope of the present invention. The internal category 302 may be included in the search field 303 to be recorded, not in the separate data field.

In operation S220, the category recommendation method externally receives a foreign identifier and a foreign category to which the external foreign identifier belongs from an outside.

As an example, the foreign identifier may be a goods identifier. The foreign identifier and foreign category may be used in the goods relay server and the shopping mall server, and each of the shopping mall servers may use a different identifier for an identical goods and a different category for the identical goods. As above described, as long as the categories are different in each of the shopping mall servers, the categories can not be registered in the goods relay server, therefore appropriate categories for various goods are required to be established and registered in the goods relay server.

In operation S230, the category recommendation method determines whether there is an internal identifier corresponding to a received foreign identifier.

Namely, the category recommendation method determines whether there is an internal identifier corresponding to a foreign identifier received from the shopping mall server and the like, from the internal category used in the goods relay server and the like when both the foreign identifier and the internal identifier are goods identifiers.

In operation S240, when there is the internal identifier corresponding to the received foreign identifier, a category to which the internal identifier belongs is selected as a category corresponding to the received foreign category.

In operation S250, a query associated with the received foreign identifier is extracted when there is no internal identifier corresponding to the received foreign identifier, from the internal category.

In this case, only the query may be extracted by exclusively using the foreign identifier. When the query is extracted by exclusively using the foreign identifier, a configuration of the category recommendation system may be simplified and time spent for extracting the query may be reduced. Also, the query may be extracted by using a foreign identifier and a foreign category. The extracting of the query by using the foreign identifier and the foreign category may contribute to calculating a similarity among information between the foreign identifier and the category database, for example, in a case of a foreign category having a three stage hierarchical structure, the query may be extracted by using a foreign identifier and a highest, a middle and a lowest hierarchy of a foreign category when extracting a query.

In this case, the extracting of the query may be performed by various methods. As an example, the query may be extracted by eliminating a space of the foreign identifier and/or foreign category, or may be extracted by using spacings of the foreign identifier and/or foreign category. Also, the query may be extracted by analyzing a morpheme of the foreign identifier and/or the foreign category. Also, the query may be extracted by sequentially executing the above mentioned methods when satisfying a predetermined search condition. As an example, when an internal identifier is retrieved by using the extracted query, extracted by eliminating a space from a foreign identifier and/or a foreign category, and when a search result is not a desirable condition, i.e. not as many as a desired number, the query is repeatedly extracted by using a spacings from the foreign identifier and/or the foreign category, and after the repeatedly extracting the query, when a search result is not still a desirable condition, i.e. not as many as a desired number, the query is repeatedly extracted by analyzing a morpheme of the foreign identifier and the foreign category.

In S260, a category recommendation method according to an embodiment of the present invention recommends at least one of the internal categories stored in the category database by using the query as a category corresponding to the foreign identifier.

In this case, a most appropriate category may be exclusively recommended, and the one recommended category may be automatically established as a category corresponding to a received foreign category.

Also, the recommended category may be a predetermined number of categories according to the establishment. In this case, the recommended category may be one category selected from a number of categories recommended by a user registering the foreign identifier, e.g. a goods identifier.

Figure 4:
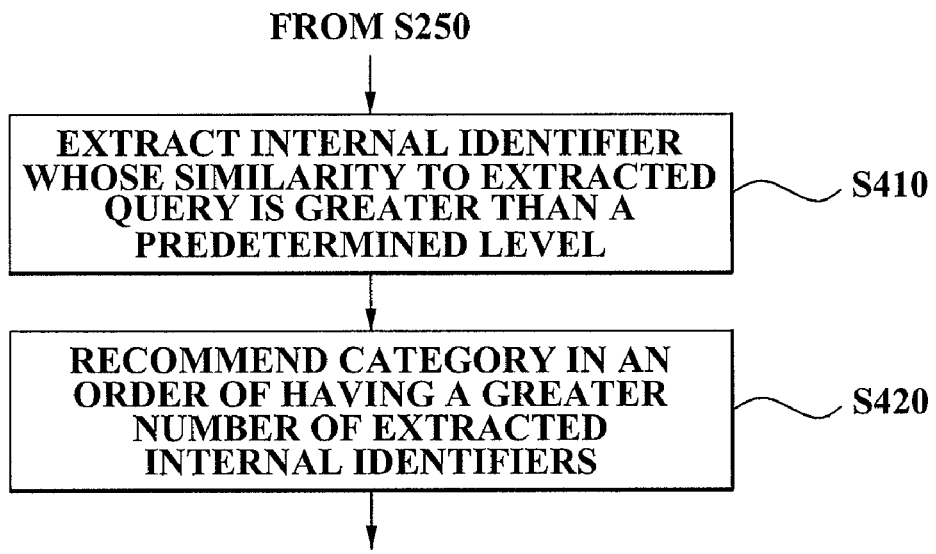
FIG. 4 is a flowchart illustrating an embodiment of the category recommendation operation illustrated in FIG. 2.

FIG. 4 is a flowchart illustrating an embodiment of the category recommendation operation S260 illustrated in FIG. 2.

Referring to FIG. 4, in operation S410, the category recommendation method searches the category database using the query, and extracts internal identifiers whose similarity to the query is greater than a predetermined level.

In this case, the similarity may be measured by various methods. The scope of the present invention even includes when the similarity is calculated by arbitrary methods, as long as a similarity degree between information of the extracted query and the category database is measured. As an example, the similarity calculation may be identical to a calculated similarity included in the paper 'Optimizing the Weight of Added Terms in Query Expansion' from 241 to 246 pages in a collection of learned papers of the 9$^{th}$ Korea Information Management Society Scholarship conference.

In operation S410, an internal identifier whose similarity is greater than 0.5 may be extracted.

In the extracting of the internal identifiers in the operation S410 illustrated in FIG. 4, only the internal identifiers, whose price corresponds to the internal identifiers that are within a predetermined range from a price corresponding to the foreign identifier, may be extracted. As an example, when a price corresponding to a foreign identifier is 45,000 Won, a price ranging from 35,000 to 55,000 Won is established as a range of a price corresponding to internal identifiers to be extracted.

Similar goods within an identical or a similar category normally have a similar range of a price, so that identifiers whose similarity to the foreign identifier is high may be immediately and easily extracted by limiting the range of the price.

Figure 5:
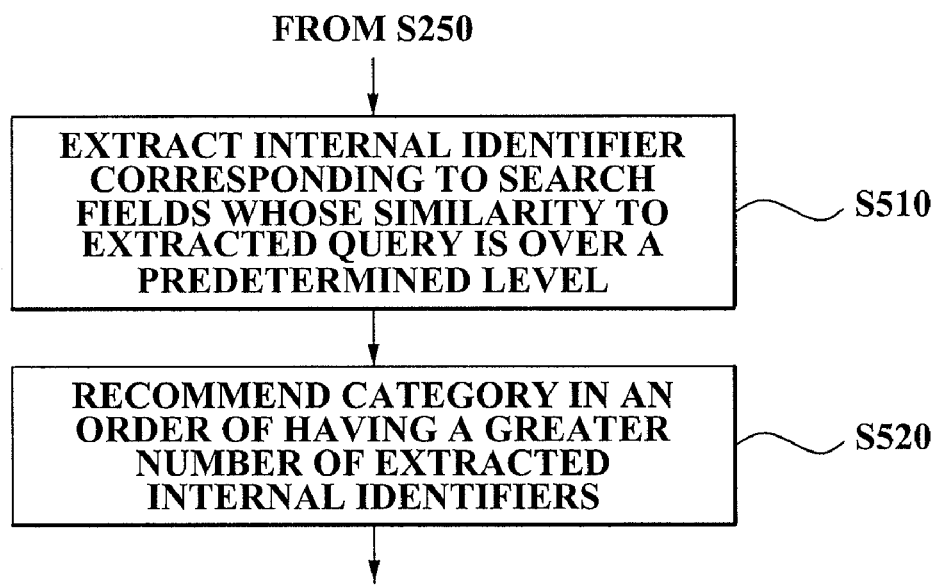
FIG. 5 is a flowchart illustrating another embodiment of the category recommendation operation illustrated in FIG. 2.

In operation S420, the category recommendation operation recommends at least one of the internal categories as a category corresponding to the foreign identifier, in an order of the internal category having a greater number of extracted internal identifiers. FIG. 5 is a flowchart illustrating another embodiment of the category recommendation operation S260 illustrated in FIG. 2.

A category database may include a search field generated by using an internal identifier and an internal category.

Referring to FIG. 5, in operation S510, the category recommendation operation searches a category database by using a query, and extracts internal identifiers whose similarity to the query is greater than a predetermined level.

As described above, the internal identifiers are extracted based on the search field generated by using the internal identifiers and internal category and the similarity among the extracted queries, therefore a more appropriate category for the foreign category may be recommended. In this case, the similarity may be measured by various methods, e.g. in operation S510, an internal identifiers whose similarity between the search field and the query is greater than 0.5 may be extracted.

In the extracting of the internal identifiers in operation S510 illustrated in FIG. 5, only internal identifiers whose a price corresponding to internal identifiers are within a predetermined range, from a price corresponding to a foreign identifier, may be extracted.

In operation S520, the category recommendation operation recommends at least one of the internal categories as a category corresponding to the foreign identifier, in an order of the internal category having a greater number of extracted internal identifiers.

In the recommending of the internal category in operation S260 illustrated in FIG. 5, the query may be extracted in another method according to the foreign category and a server transmitting the foreign category. Namely, when the foreign identifier is a goods identifier and the server transmitting the foreign identifier and foreign category is a shopping mall server, a query for each shopping mall may be extracted by a different method. As an example, for an A shopping mall server, a query is extracted by using a goods identifier, for a B shopping mall server, a query is extracted by using a lowest hierarchy of a foreign category and a goods identifiers, and for a C shopping mall server, a query is extracted by using an entire foreign category and goods identifier. Therefore, the category may be effective by establishing an appropriate recommendation method of extracting a query according to a property of the server transmitting the foreign identifier and the foreign category.

Furthermore, in the recommendation of the category in operation S260 illustrated in FIG. 2, an object of a similarity to the query may be different according to the foreign identifier and the server transmitting the foreign category. As an example, for an A shopping mall server, an internal identifier may be extracted based on a similarity between the query and the internal identifier, and for a B shopping mall server, an internal identifier may be extracted based on a similarity among search fields generated by using the query, the internal identifier, and the internal category.

FIG. 6 is a diagram illustrating a display of counting a number of internal identifiers for each internal category according to a query, according to an embodiment of the present invention.

Referring to FIG. 6, a foreign identifier 610 'loveletter coconut', and a foreign category 620 'food/mart@importedfood@snack(efoodmart)', are received from an outside shopping mall site, i.e. 'dnshop'.

The category recommendation method according to one embodiment of the present invention extracts queries 631, 632 and 633 associated with the foreign identifier 610 'loveletter coconut' and the foreign category 620 'food/mart@importedfood@snack(efoodmart)'. In this case, the queries 631, 632 and 633 associated with the foreign identifier 610 may be generated by exclusively using the foreign identifier 610 or by using both the foreign identifier 610 and the foreign category 620. The query 633 is generated by exclusively using the foreign identifier 610, and the queries 631 and 632 are generated by using both the foreign identifier 610 and the foreign category 620. Specifically, the query 631 is generated by using a lowest hierarchy 'snack(efoodmart)' from the foreign identifier 610 and the foreign category 620, and the query 632 is generated by using all hierarchies 'food/mart@importedfood@snack(efoodmart)' from the foreign identifier 610 and the foreign category 620.

Referring to a search result 641 that an internal identifier for each internal category is extracted by using the query 631, a number of an internal identifier whose similarity to the query 631, including category ID '08040103', within the internal category, is greater than a predetermined level, i.e. over 0.5, is one.

Referring to a search result 642 that an internal identifier for each internal category is extracted by using the query 632, a number of an internal identifier whose similarity to the query 632, including category ID '08040103', within the internal category, is greater than a predetermined level is one.

Referring to a search result 643 that an internal identifier for each internal category is extracted by using the query 633, a number of an internal identifier whose similarity to the query 633, including category ID '08040103', within the internal category, is greater than a predetermined level is one.

As described above, identifier in one embodiment in FIG. 6, using each of the queries 631, 632 and 633, the internal category including a result of the extracting of the internal category is one, therefore a category 'food/supermarket@processedfood@confectionaries@cookie/biscuit/pie' is recommended as a category corresponding to the foreign identifier 610.

In order to recommend an optimal internal category corresponding to the foreign identifier 610, the queries 631, 632 and 633 may change, comparison objects for the similarity within a category database to be searched by using the queries 631, 632 and 633 may be changed, or the similarity, i.e. a criterion of the extracting of the internal identifier, may be changed. Furthermore, as described above, according to a foreign identifier and a server transmitting the foreign category, the comparison objects for the similarity within the category database to be searched by using the queries 631, 632, and 633, or the similarity, i.e. a criterion of the extracting of the internal identifier, may be changed.

Figure 7:
FIG. 7 is a diagram illustrating a display of counting a number of internal identifiers for each internal category according to a query, according to another embodiment of the present invention.

FIG. 7 is a diagram illustrating a display of counting a number of internal identifiers for each internal category according to a query, according to another embodiment of the present invention.

Referring to FIG. 7, a foreign identifier 710 '[lulugold] royalcubic rolex couple ring cr01-53' and a foreign category 720 'openmarket@fashion@jewelry@14K/18K' are received from an outside shopping mall, i.e. interpark.

The category recommendation method according to one embodiment of the present invention extracts queries 731, 732 and 733 associated with the foreign identifier 710 '[lulugold] royalcubic rolex couple ring cr01-53'. In this case, the queries 731, 732 and 733 associated with the foreign identifier 710 '[lulugold] royalcubic rolex couple ring cr01-53' may be extracted by exclusively using the foreign identifier 710 or by using both the foreign identifier 710 and foreign category 720. In FIG. 7, the query 733 is extracted by exclusively using the foreign identifier 710, and the queries 731 and 732 are extracted by using both the foreign identifier 710 and foreign category 720. Specifically, the query 731 is extracted by using a lowest hierarchy '14K/18K' from the foreign category 720, and the query 732 is extracted by using all hierarchies 'openmarket@fashion@jewelry@14K/18K' from the foreign category 720.

Referring to a search result 741 of an internal identifier for each internal category that is extracted by using the query 731, a number of internal identifiers whose similarity to the query 731, including a category ID '14000003' within the internal category, and is greater than a predetermined level, i.e. over 0.5, is three.

A number of internal identifiers whose similarity to the query 731, including a category ID '14000001' within the internal category, is greater than a predetermined level, is three.

Also, a number of internal identifiers whose similarity to the query 731, including a category ID '14000403' within the internal category, is greater than a predetermined level, is two.

Also, a number of internal identifiers whose similarity to the query 731, including a category ID '14000000' within the internal category, is greater than a predetermined level, is two.

Also, a number of internal identifiers whose similarity to the query 731, including a category ID '14000401' within the internal category, is greater than a predetermined level, is one.

Therefore, the category recommendation method according to one embodiment of the present invention recommends a category 'accessory/watch@gold/siver@14K@couple ring' that includes a greatest number of the internal identifiers whose similarity to the query 731 is greater than a predetermined level, or a category corresponding to '[lulugold] royal cubic rolex couple ring CR01-53'. When the internal categories include an identical number of internal identifier, selecting of a category may change according to initial setting. As an example, an internal category including a smaller ASCII code value may be recommended as a category corresponding to the foreign identifier, from internal categories including an identical number of internal identifier.

Referring to the search result 742 that an internal identifier is extracted for each internal category by using the query 732, a number of internal identifiers whose similarity to the query 732, including a category ID '14000003' within the internal category, is greater than a predetermined level, i.e. over 0.5, is three.

A number of internal identifiers whose similarity to the query 732, including a category ID '14000403', within the internal category, is greater than a predetermined level, is two.

Also, a number of internal identifiers whose similarity to the query 732, including a category ID '14070403' within the internal category, is greater than a predetermined level, is one.

Also, a number of internal identifiers whose similarity to the query 732, including a category ID '14000001' within the internal category, is greater than a predetermined level, is one.

Also, a number of internal identifiers whose similarity to the query 732, including a category ID '14000000' within the internal category, is greater than a predetermined level, is one.

Therefore, the category recommendation method according to one embodiment of the present invention recommends the category 'accessory/watch@gold/siver@14K@couple ring' that includes a greatest number of the internal identifiers whose similarity to the query 732 is greater than a predetermined level, corresponding to the foreign identifier 710 '[lulugold] royal cubic rolex couple ring CR01-53'.

Referring to a search result 743 that an internal identifier for each internal category is extracted by using the query 733, a number of internal identifiers whose similarity to the query 733, including a category ID '14000003' within the internal category, is greater than a predetermined level, i.e. over 0.5, is three.

A number of internal identifiers whose similarity to the query 733, including a category ID '14000403' within the internal category, is greater than a predetermined level, is two.

Also, a number of internal identifiers whose similarity to the query 733, including a category ID '14000401' within the internal category, is greater than a predetermined level, is one.

Also, a number of internal identifiers whose similarity to the query 733, including a category ID '14000000' within the internal category, is greater than a predetermined level, is one.

Therefore, the category recommendation method according to one embodiment of the present invention recommends the category 'accessory/watch@gold/siver@14K@couple ring' including a greatest number of the internal identifiers whose similarity to the query 733 is greater than a predetermined level, corresponding to the foreign identifier 710 '[lulugold] royal cubic rolex couple ring CR01-53'.

In certain embodiments in FIG. 7, a query extraction method may be changed in order to recommend a most appropriate internal category.

As described above, when one internal category is recommended, the one recommended internal category may be automatically established as an internal category corresponding to a received foreign category.

From the above, the case in which one internal category including a greatest number of the internal identifiers whose similarity to the query is greater than a predetermined level is exclusively recommended, is described, however over two internal categories may be recommended in an order of the internal category having a greater number of internal identifiers. In this case, a user registered a foreign identifier may select one from over the recommended two categories. As an example, the category recommendation method may recommend two internal categories 'accessory/watch@gold/siver@14K@couple ring' and 'accessory/watch@gold/siver@silver@couple ring' as a category corresponding to the foreign category 710 '[lulugold] royalcubic rolex couple ring cr01-53'.

Besides the changes of the queries 731, 732 and 733, in order to recommend an optimal internal category corresponding to the foreign identifier 710, comparison objects for the similarity within a category database to be searched by using the queries 731, 732 and 733 may be changed, or the similarity, i.e. a criterion of the extracting of the internal identifier, may be changed. Furthermore, as described above, according to a foreign identifier and a server transmitting the foreign category, the comparison objects for the similarity within the category database to be searched by using the queries 731, 732 and 733 or the similarity, i.e. a criterion of the extracting of the internal identifier, may be changed. As an example, in a case of a foreign identifier and a foreign category received from the A shopping mall, a query is extracted by using the foreign identifier, the foreign category, and the query 731, in a case of a foreign identifier and a foreign category received from the B shopping mall, a query is extracted by using the foreign identifier and the query 733.

The category recommendation method according to one embodiment of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, etc. including a carrier wave transmitting signals specifying the program instructions, data structures, etc. Examples of program instructions include both machine code, such as produced by a compiler, and files containing higher level code that may be executed by the computer using an interpreter. The described hardware devices may be configured to act as one or more software modules in order to perform the operations of one embodiment of the present invention.

Figure 8:
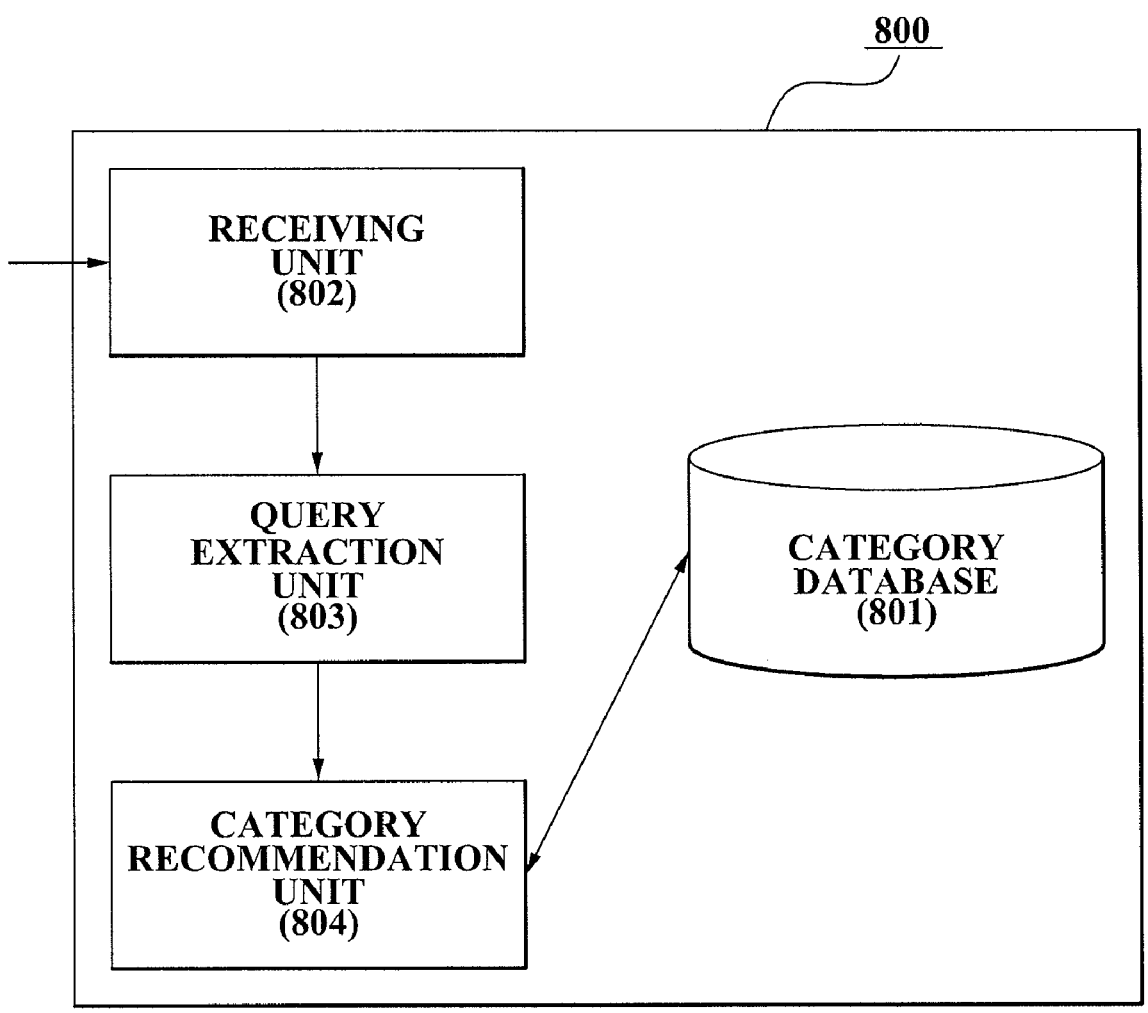
FIG. 8 is a block diagram illustrating a configuration of a category recommendation system according to an embodiment of the present invention.

FIG. 8 is a block diagram illustrating a configuration of a category recommendation system according to an embodiment of the present invention.

Referring to FIG. 8, a category recommendation system 800 according to an embodiment of the present invention includes a category database 801, a receiving unit 802, a query extraction unit 803 and a category recommendation unit 804.

The category database 801 includes an internal identifier and an internal category where the internal identifier belongs to. In this case, the internal identifier and the internal category indicate an identifier and a category used in a predetermined goods relay server, which is distinguished from a foreign identifier and a foreign category indicate identifiers and categories used in other servers, excluding the server. In this case, the identifier is for identifying goods, a multimedia file, knowledge, news, and the like, i.e. a goods name, a file name, a keyword of the knowledge, and a title of the news.

The category database 801 further includes a search field, as described in FIG. 3. The internal category may be stored in a type of an identifier indicating a category. The search field indicates a field of a search object when searching a recommendation category by using a query. The search field may include information associated with a goods model, e.g. a brand name, a model name, an item name, a keyword, and the like, or information regarding a category. As an example, the search field may exclusively include information regarding the internal identifier, and may include both the information regarding the internal identifier and information regarding the internal category.

The receiving unit 802 receives a foreign identifier and a foreign category to which the foreign identifier belongs from an outside.

As an example, the query extraction unit 803 extracts a query associated with the foreign identifier. In this case, when the query is extracted by exclusively using a foreign identifier, the configuration of a category recommendation system may be simplified and time spent for extracting the query may be reduced. As an example, in a case of a foreign category having a three stage hierarchical structure, the query may be extracted by using a lowest hierarchy of the foreign identifier and the foreign category when extracting a query. Also, in the case of the foreign category having the three stage hierarchical structure, the query may be extracted by using a foreign identifier and a highest, a middle and a lowest hierarchy of the foreign category when extracting a query.

In this case, the extracting of the query may be performed by various methods. As an example, the query may be extracted by eliminating a space of the foreign identifier and/or foreign category, or may be extracted by using spacings of the foreign identifier and/or foreign category. Also, the query may be extracted by analyzing a morpheme of the foreign identifier and/or the foreign category. Also, the query may be extracted by sequentially executing the above mentioned methods when satisfying a predetermined search condition. As an example, when an internal identifier is retrieved by using the extracted query through eliminating a space from a foreign identifier and/or a foreign category to extract a query, and when a search result is not in a desirable condition, i.e. not as many as a desired number, the query is repeatedly extracted by using spacings from the foreign identifier and/or the foreign category, and after the repeatedly extracting the query, when a search result is not still a desirable condition, i.e. not as many as a desired number, the query is repeatedly extracted by analyzing a morpheme of the foreign identifier and the foreign category.

The category recommendation unit 804 recommends at least one of the internal categories stored in the category database 801 by using the query as a category corresponding to the foreign identifier.

In this case, a most appropriate category may be exclusively recommended and the one recommended category may be automatically established as a category corresponding to a received foreign identifier.

Also, the recommended category may be a predetermined number of the category according to the establishment. In this case, the recommended category may be one selected category of categories recommended by a user registering the foreign identifier, e.g. a goods identifier.

The category recommendation unit 804 may perform according to a flow of operations described through FIGS. 4 and 5.

The category recommendation unit 804 searches the category database 801 by using the query, and extracts internal identifiers whose similarity to the query is greater than a predetermined level; and recommends at least one of the internal categories as a category corresponding to the foreign identifier, in an order of the internal category having a greater number of extracted internal identifiers.

Although embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

According to embodiments of the present invention, there is provided a category recommendation method and a system which can extract a query associated with a foreign identifier and recommend an internal category having a high similarity with the query as a category corresponding to the foreign category, so that a proper category for the foreign category is effectively recommended.

According to embodiments of the present invention, there is provided a category recommendation method and a system which can immediately and accurately recommend a proper category for a foreign category from internal categories stored in a database, so that information on Internet websites is systemically is collected.

According to embodiments of the present invention, there is provided a category recommendation method and a system which can recommend a proper category for a foreign identifier from an internal category stored in a database, so that category matching is automated by increasing a recommendation matching rate.

What is claimed is:

1. A method that utilizes a processor to update a product database, the method comprising:
    maintaining a database comprising a plurality of database entries, wherein each database entry comprises a classification field and a plurality of additional fields, wherein the classification field comprises a classification of a product of the database entry;
    receiving data associated with a product for adding to the database as a new entry;
    generating a query from the data associated with the product for adding to the database as the new entry;
    computing, using the processor, a value of the query indicating a similarity of the query to information saved in at least one selected field of a database entry, wherein the computing is repeated for at least part of the plurality of database entries;
    identifying database entries including information in the at least one selected field that have values greater than a reference value;
    identifying a classification associated with a greatest number of the identified database entries among classifications saved in the classification fields of the identified database entries; and
    assigning the identified classification to the classification field of the new entry.

2. The method of claim 1, wherein the data is retrieved from an on-line store for selling the product.

3. The method of claim 2, wherein the query comprises a word or phrase that the on-line store uses to identify, describe or classify the product.

4. The method of claim 2, wherein the plurality of fields further comprises a product source field, wherein the method further comprises adding to the product source field of the new entry a name of the on-line store.

5. The method of claim 2, wherein the plurality of fields further comprises a price field, wherein the method further comprises adding to the price field of the new entry a price of the product available at the on-line store.

6. The method of claim 5, further comprising filtering the price field of a group of database entries using a price range so as to select a smaller group of entries with a price falling in the price range.

7. The method of claim 1, wherein the receiving of the data comprises receiving the data from an on-line store, wherein the data comprises at least one selected from the group consisting of a name of the product, a classification of the product, an identification code of the product, and a description of the product that are used in the on-line store.

8. The method of claim 7, wherein the query is created using terms in the name of the product, the classification of the product, the identification code of the product, and the description of the product.

9. The method of claim 7, wherein the plurality of fields comprise a product identification code field, wherein the method further comprises determining whether the database comprises a database entry having an internal identifier in the product identification code field that is identical to the identification code of the product that is used in the on-line store.

10. The method of claim 9, wherein the generating, the computing, the identifying of the database entries, and the identifying of the classification are conducted only when it is determined that there is no database entry that includes the identical identification code in the product identification code field.

11. The method of claim 9, wherein the at least one selected field comprises the product identification code field.

12. The method of claim 9, wherein the at least one selected field comprises a field other than the product identification code field.

13. The method of claim 9, wherein the internal identifier is a model number of the product.

14. The method of claim 1, wherein the query comprises a string of a plurality of words associated with the product.

15. The method of claim 1, wherein the identifying of the classification comprises:
    identifying different classifications used in the identified database entries;
    counting the number of database entries for each different classification; and
    comparing the counted numbers to determine the classification associated with the greatest number of the identified database entries.

16. A method of running a price comparison engine, the method comprising:
    maintaining a product database, the maintaining of the product data base comprising:
        maintaining a database comprising a plurality of database entries, wherein each database entry comprises a classification field and a plurality of additional fields, wherein the classification field comprises a classification of a product of the database entry,
        receiving data associated with a product for adding to the database as a new entry,
        generating a query from the data associated with the product for adding to the database as the new entry,
        computing, using the processor, a value of the query indicating a similarity of the query to information saved in at least one selected field of a database entry, wherein the computing is repeated for at least part of the plurality of database entries,
        identifying database entries including information in the at least one selected field that have values greater than a reference value,
        identifying a classification associated with a greatest number of the identified database entries among classifications saved in the classification fields of the identified database entries, and
        assigning the identified classification to the classification field of the new entry;
    receiving, from a remote computer, a search request for a type of products;
    conducting a search in the database using information included in the search request; and
    sending a search result to the remote computer.

\* \* \* \* \*